US007673063B2

(12) United States Patent
Xie et al.

(10) Patent No.: US 7,673,063 B2
(45) Date of Patent: Mar. 2, 2010

(54) METHODS FOR STREAMING MEDIA DATA

(75) Inventors: Qiaobing Xie, Wheeling, IL (US); Joseph R. Schumacher, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 947 days.

(21) Appl. No.: 10/966,091

(22) Filed: Oct. 15, 2004

(65) Prior Publication Data

US 2006/0085551 A1 Apr. 20, 2006

(51) Int. Cl.
G06F 15/16 (2006.01)
(52) U.S. Cl. ...................... 709/231; 709/236
(58) Field of Classification Search ................ 709/203, 709/206, 231, 234, 236; 348/207; 725/101, 725/102
See application file for complete search history.

(56) References Cited

U.S. PATENT DOCUMENTS

| 6,272,190 | B1 | 8/2001 | Campana, Jr. | |
| 6,442,694 | B1 * | 8/2002 | Bergman et al. | 726/22 |
| 6,658,073 | B1 | 12/2003 | Grunert | |
| 6,674,755 | B1 * | 1/2004 | Potter et al. | 370/395.1 |
| 6,820,133 | B1 * | 11/2004 | Grove et al. | 709/238 |
| 6,904,059 | B1 | 6/2005 | Newson et al. | |
| 7,266,609 | B2 * | 9/2007 | Bill et al. | 709/231 |
| 7,483,487 | B2 * | 1/2009 | Liu et al. | 375/240.11 |
| 7,548,995 | B2 * | 6/2009 | Thukral | 710/20 |
| 7,577,714 | B2 * | 8/2009 | Saunders et al. | 709/213 |
| 2002/0161847 | A1 * | 10/2002 | Weigand et al. | 709/213 |
| 2003/0099202 | A1 | 5/2003 | Lear et al. | |
| 2004/0093618 | A1 * | 5/2004 | Baldwin et al. | 725/101 |
| 2004/0123324 | A1 * | 6/2004 | Sazzad et al. | 725/89 |
| 2004/0223058 | A1 * | 11/2004 | Richter et al. | 348/207.1 |
| 2005/0013249 | A1 * | 1/2005 | Kong et al. | 370/235 |

FOREIGN PATENT DOCUMENTS

WO 2004086748 A2 10/2004

* cited by examiner

*Primary Examiner*—Nathan Flynn
*Assistant Examiner*—Joshua Joo

(57) ABSTRACT

In the present technique of streaming a main media stream that has been requested, an anti-shadow stream (36) that represents a backup copy of the main media stream (24) is sent along with an output media stream (34) that represents an output copy of the main media stream. The content of the anti-shadow stream (36) is preferably forward-shifted in time from the output media stream (34) so as to provide replacement of loss data of the output stream. Put differently, sequenced data frames of the output stream (34) are delayed by order compared to that of the anti-shadow stream (36).

10 Claims, 8 Drawing Sheets

METHODS FOR STREAMING MEDIA DATA

TECHNICAL FIELD

This invention relates generally to a streaming process for media data over a communication network.

BACKGROUND

The transmission of media data, such as audio and video data, over a network is becoming more common. Users can now watch all types of media data, from a pre-recorded show to a live concert, online over the Internet or on their wireless cellular networks. Because the media data tend to take up large amounts of memory, their transmission requires vast resources. As a result, the media data are generally streamed over the network. Streaming enables the media data to be played in real time as the data are being downloaded over the network as opposed to storing the entire file first to permanent memory. Basically, media data is first divided into a sequence of frames at the sender. Each frame in the sequence contains a small portion of the media data and each frame is assigned a timestamp to indicate its position in the media data, which is generally relative to the beginning of the media. Media data frames are then sent one or a few at a time, and the receiver, such as a media player, buffers the sent frames and outputs the frames according to a timeline reconstructed based on the timestamps carried in the received frames. Streaming of the media data generally avoids the delay entailed in downloading an entire file and then playing it with a helper application at a later time.

Streaming of the media data is also becoming more prevalent within a cellular wireless setting. In fact, wireless broadcast and/or multicast services are now one of the major new features in the Third Generation Partnership Project (3GPP) and the third Generation Partnership Project 2 (3GPP2) communication networks. A major technical problem, however, arises with streaming in a wireless system. Specifically, one problem is that wireless networks tend to be more unstable than landline networks, because the wireless signal can be temporarily blocked or shadowed as the receiver moves between different environments. For example, the wireless signal can be temporarily blocked or shadowed by tall buildings in a city or tunnels through mountains or under rivers. Sometimes, the receiver can miss several minutes of the media data that may not be recoverable as the receiver may be unable to receive for up to several minutes. Although this is far less of an issue with wired Internet Protocol multimedia services, they can nevertheless suffer from similar but minor shadowing problems due to such conditions as transit congestion in a local network. All this, in turn, often causes degradation of the service quality or interruptions of the service in both wired and wireless networks.

To address these problems, one proposed method, known as Forward Error Correction, adds extra bits specifically for error correction to any character or code block of the data prior to transmission. If the transmission is received in error, the correction bits are used to check and repair the data. This method, however, only addresses data corruption caused by bit errors during data transfer or the loss of a few frames of data; it does not correct a total signal blockage.

Another proposed solution is a technique known as jitter buffers, which is widely used in many real-time media receivers such as RealPlayer® and QuickTime®. A jitter buffer is a shared data area where voice packets can be collected, stored, and sent to the voice processor in correctly spaced intervals according to their originally assigned sequence numbers. Variations in packet arrival time, called jitter, can occur because of network congestion, timing drift, or route changes. The jitter buffer, which is located at the receiving end of the voice connection, intentionally delays processing of the arriving packets so that the end user experiences a clear connection with very little sound distortion. Although this method can combat minor temporal jitters, it is impractical for correcting large delays (e.g., more than one minute). This method is also incapable of compensating for the data loss. Moreover, the use of jitter buffers tends to force the receiver to wait at the start of the media stream until the jitter buffer has been filled, but users of the wireless broadcast or multicast services may have very little tolerance for this start latency.

Still another solution, which is generally done in a point-to-point communication scenario to compensate for data loss, is to retransmit the lost data. This method, however, is impractical in a broadcast or multicast scenario due to the complexity of end-to-end synchronization between the sender and multiple receivers. Moreover, the retransmission method requires means for sending feedback from the data receiver to the sender that may not exist in most broadcast or multicast scenarios. Another proposed method is to use interpolation, which is generally used with wireless networks, but this is also not workable because it is ineffective to combat losses of consecutive frames.

BRIEF DESCRIPTION OF THE DRAWINGS

The above needs are at least partially met through provision of the streaming process of media data described in the following detailed description, particularly when studied in conjunction with the drawings, wherein.

Figure 1:
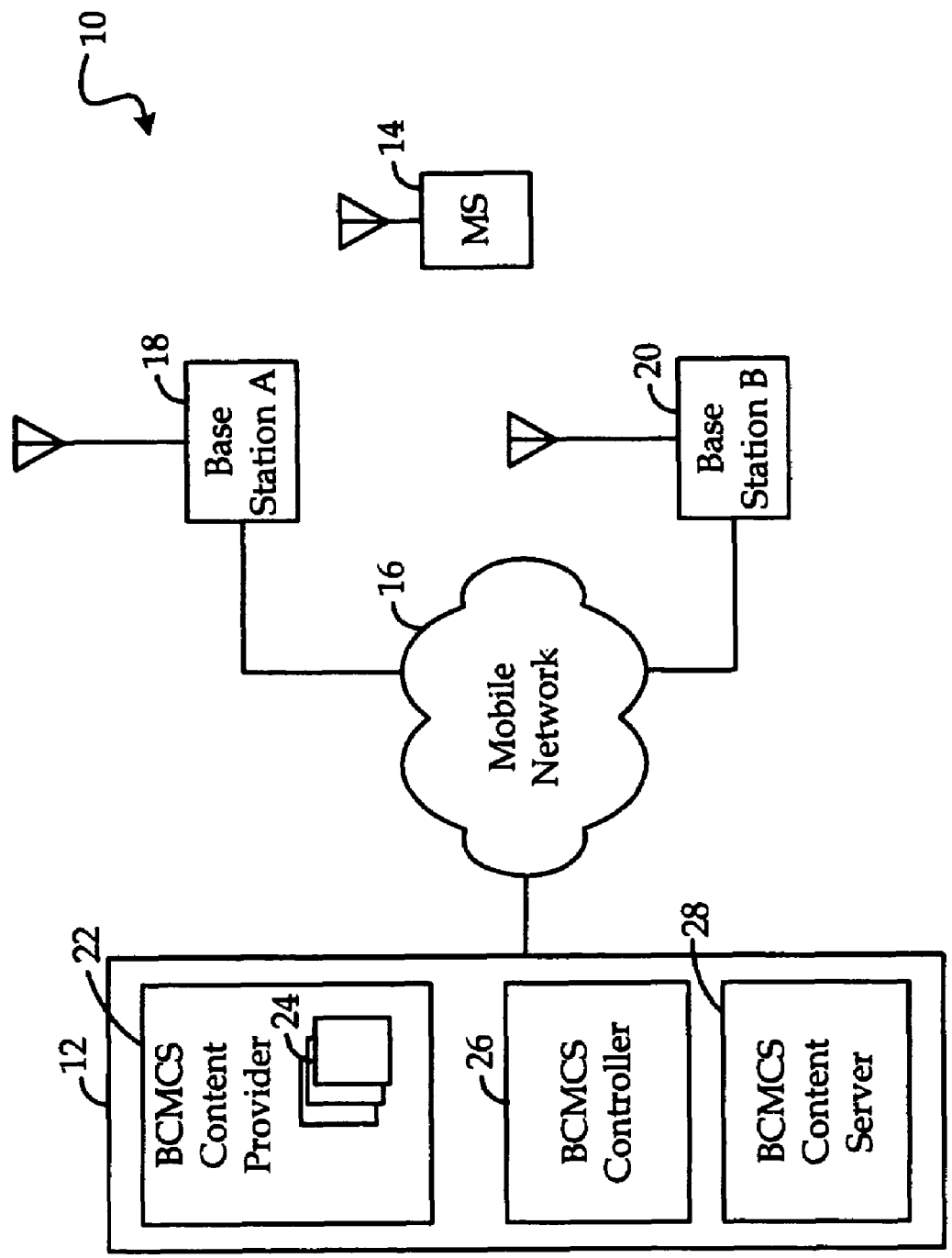
FIG. 1 comprises a block diagram of a typical wireless communication system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a streaming process of media data has been provided, which includes an anti-shadow stream that represents a backup copy of a main media stream and an output media stream that represents an output copy of the main media stream. The anti-shadow stream, in one embodiment, is formatted according to a predefined configuration that minimizes memory usage. As such, depending on the implementation, the predefined configuration can be a lower resolution version of the main media stream, a reduced number of data frames version of the main media stream, a compressed version of the main media stream, or simply an unaltered version of the main media stream. The output copy of the main media stream, on the other hand, represents a delayed version of the anti-shadow stream according to a time offset.

Put differently, the anti-shadow stream is forward-shifted from the output media stream. According to one embodiment, the delay of the output media stream is done by sending sequenced frames of the anti-shadow stream ahead of sequenced frames of the output media stream according to the time offset. Another embodiment is to format the anti-shadow stream forward-shifted from the output media stream, while keeping the output media stream the same version as the main media stream. The main media stream, in various teachings, includes both pre-recorded and live media stream.

According to different embodiments, the anti-shadow stream and the output media stream can be sent simultaneously using two separate logical communication channels or two different radio frequencies. In one embodiment, both streams are sent simultaneously using a single sequence of data frames. As an output process, according to various embodiments, it is determined whether a selected media stream packet is stored in a main media buffer that stores the output copy of the main media stream. In another embodiment, it is also determined whether the selected media stream packet is stored in the anti-shadow buffer that stores the backup copy of the main media stream. The media stream packet is retrieved from either the main media buffer or the anti-shadow buffer and outputted. If the selected media stream packet cannot be found in either of these buffers, instructions for loss concealment of the selected media stream packet are optionally sent, according to one embodiment.

In one preferred embodiment, the media streams that are stored in the anti-shadow buffer are purged to save memory in the buffer. According to one preferred embodiment, it is determined whether an oldest packet stored in the anti-shadow buffer is older than a last packet that was outputted. If so, the oldest media stream from the anti-shadow buffer is removed from the buffer. According to various teachings, the output copy of the main media stream stored in the main media buffer is delayed from the backup copy stored in the anti-shadow buffer according to the time offset. Using the main media buffer and the anti-shadow buffer, according to an embodiment, it is determined whether a received media stream packet is part of the anti-shadow stream. If so, the received media stream packet is stored in the anti-shadow buffer. Otherwise, the received media stream is stored in the main media buffer.

Through the embodiments of various teachings, a streaming method for media data has been provided that is better suited for wireless networks and offers added flexibility in a wired network. Since the receiver is no longer required to wait at the start of the media stream for the buffer to be filled, the service start latency of the streaming process has been substantially eliminated. Moreover, long signal blockages, such as ones greater than a minute, can now be effectively compensated for through the various teachings. In fact, the entire media stream may be fully recoverable from repeated occurrences of signal blockage, since the anti-shadow buffer can be refilled once each signal blockage is over. Because the various embodiments enable the service quality during signal blockage to be controlled by the service provider, this creates new opportunities for layered pricing of the broadcast service. The various teachings further offer backward compatibility, and thus existing receiver devices that do not support the new mechanism will still work with the embodiments described below. These various embodiments also offer great flexibility since they are not platform dependent. As a result, the multiple embodiments are applicable to multiple networks, including both wired and wireless environments.

Referring now to the drawings, and in particular to FIG. 1, for purposes of providing an illustrative but nonexhaustive example to facilitate this description, a specific operational paradigm using a wireless network is shown and indicated generally at 10. Those skilled in the art, however, will recognize and appreciate that the specifics of this illustrative example are not exhaustive of the invention and that the teachings set forth herein are applicable in a variety of alternative settings. For example, since the various teachings are not platform dependent, they can be applied to broadcast and multimedia initiatives in a 3GPP or a 3GPP2 system. Any digital broadcast services or digital satellite services are also applicable. For wired systems, because the various embodiments also provide a better alternative to the RealPlayer®, QuickTime®, and other similar applications, general Internet-based real-time streaming media services for stored or live audio or video medias including for example helper applications or browser plug-ins, are contemplated. Thus, these various platforms and network implementations are within the scope of the invention, and various embodiments for these multiple implementations are readily understood and appreciated by one skilled in the art.

Pursuant to this example, a broadcast and multicast service (BCMCS) 12 is offered to a mobile station 14 via a mobile network 16. As with most typical wireless networks, the mobile station 14 generally requests the BCMCS 12 through multiple base stations, specifically as shown, a base station A 18 and a base station B 20. The base stations, in turn, send the mobile station's request to the BCMCS 12. To provide service to the mobile station, the BCMCS 12 generally includes a BCMCS content provider 22 that stores the main media streams 24, a BCMCS controller 26 that controls the streaming of the stored media files, and a BCMCS server 28 that transmits the media streams. These various teachings can be implemented in any of the components shown in the system 10. Any components within the system can be used to implement the various teachings described below. As an example, the description below is based on an implementation using specifically the BCMCS 12 and the mobile station 14.

Figure 2:
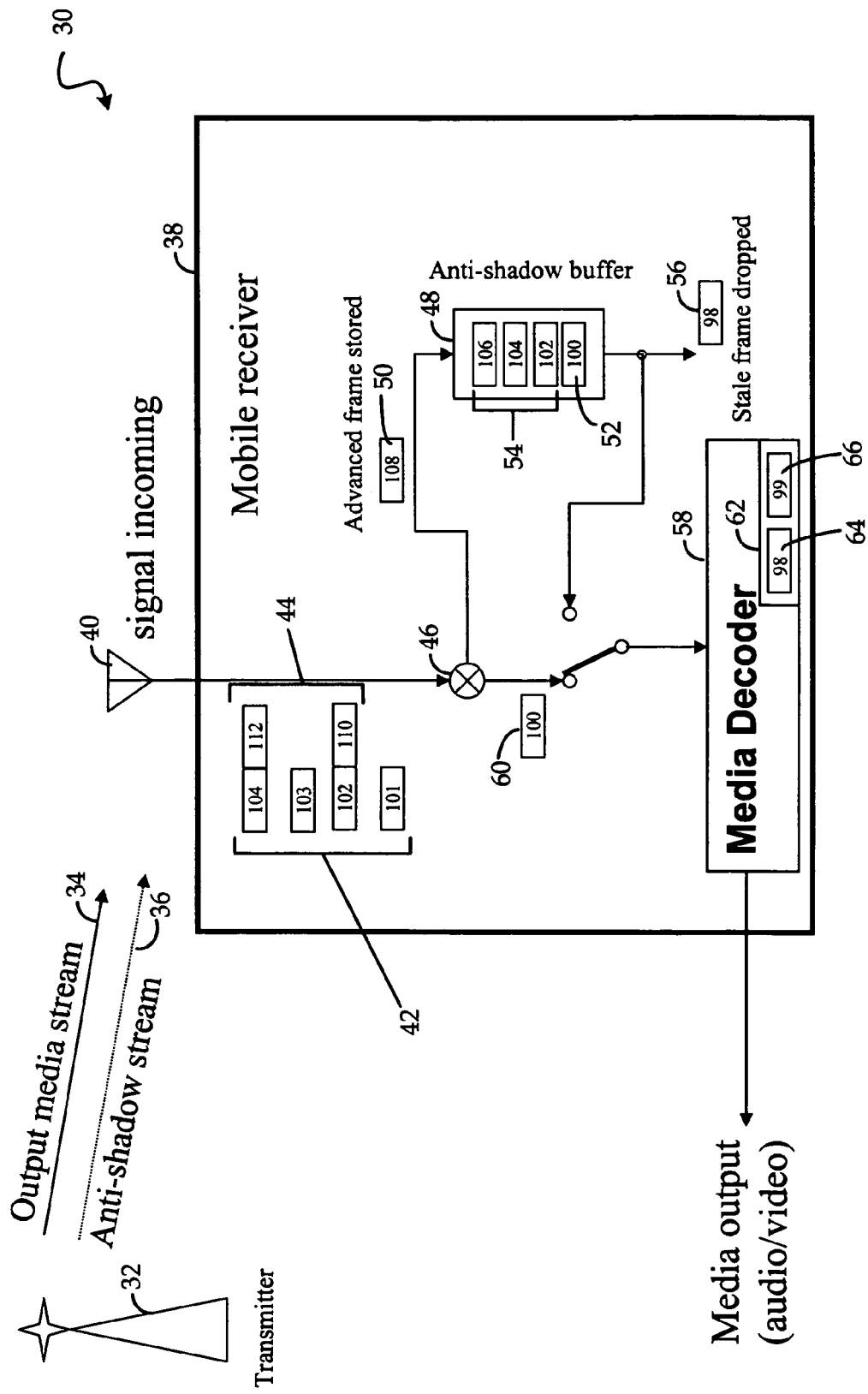
FIG. 2 comprises a block diagram of a mobile receiver during uninterrupted transmission according to various embodiments of the invention.

Turning now to FIG. 2, a block diagram of a mobile receiver during uninterrupted transmission according to various embodiments is shown and indicated generally at 30. To transmit a main media stream 24, a transmitter 32 (e.g., the base stations A and B 18, 20 shown in FIG. 1) sends out an output media stream 34 and anti-shadow stream 36 of the main media stream, which are received by a mobile receiver 38 (e.g., the mobile station 14 shown in FIG. 1). Specifically, as shown, an incoming signal 40, which contains data frames (e.g., data frame number 101, 102, 103, and 104) of the output media stream 42 and data frames (e.g., data frame number 110 and 112) of the anti-shadow stream 44, are received by a controller 46 of the mobile receiver 38. The controller 46 of the mobile receiver 38, in turn, forwards the data frames of the two streams to their appropriate designations. Note that in this embodiment shown, the data frames of output media stream 42 are delayed from the data frames of the anti-shadow stream 44 by approximately 8 frames. In other words, the anti-shadow stream is forward-shifted in its data frame sequence from that of the output media stream. Moreover, the anti-shadow stream contains a half the number of data frames (e.g., even numbered frames) of the main media stream in order to reduce bandwidth as well as memory usage.

In this particular embodiment, an anti-shadow buffer 48 is included to buffer data frames of the anti-shadow stream. As shown, the controller 46 accordingly forwards a data frame 50 bearing sequence number 108, which is identified as a next frame of the anti-shadow stream, to the anti-shadow buffer 48. The buffer 48 contains other previously sent data frames 52 (e.g., data frame sequence number 100), 54 (e.g., data frame sequence numbers 102-106), and they are in the sequential order of the data frames of the main media stream. Please note that besides examining the sequence number of the frames, other techniques to identify the next frame in the anti-shadow buffer are contemplated. For example, a timestamp of the frame can be examined, or the controller can readily determine that a frame is an anti-shadow frame because it came from the logical channel assigned for transmitting the anti-shadow stream. However, these other implementations are readily appreciated by one skilled in the art, and thus they are within the scope of the various teachings.

To make space for the newly received data frame 50, a stale frame 56 is dropped from the buffer 48, and in this case the stale frame bears the sequence number 98. Since the anti-shadow stream represents a backup copy of the main media stream, the data frames stored in the buffer 48 are generally not used unless there is a signal blockage. To provide for this scenario, the buffer 48 is directly connected a media decoder 58, which decodes the data frames and output them to the user. As noted, the data frames can be media outputs of audio or video data.

Turning to the data frames of the output media stream, a data frame 60 bearing a sequence number 100 shown as part of the output media stream 34 is forwarded to the media decoder 58 by the controller 46. In this embodiment shown, a separate main media buffer 62 is included with the media decoder 58 as the data frames 64, 66 (e.g., data frame sequence 98 and 99, respectively) are being outputted. Furthermore, in this embodiment, the data frame 56 of the anti-shadow stream is efficiently being dropped while the data frame 64 of the output media stream is being outputted, and they both represent data sequence number 98 of the main media stream. It should be noted though that the various teachings contemplate an implementation of a separate main media buffer that is not part of the media decoder 58 or without a separate main media buffer, at all. These various alternative embodiments greatly depend upon the configuration of the system and its components, and as such, they are nevertheless within the scope of the present teachings. The general overview of the mobile receiver during an uninterrupted transmission from the transmitter 32 has been shown as one embodiment and as an example.

Figure 3:
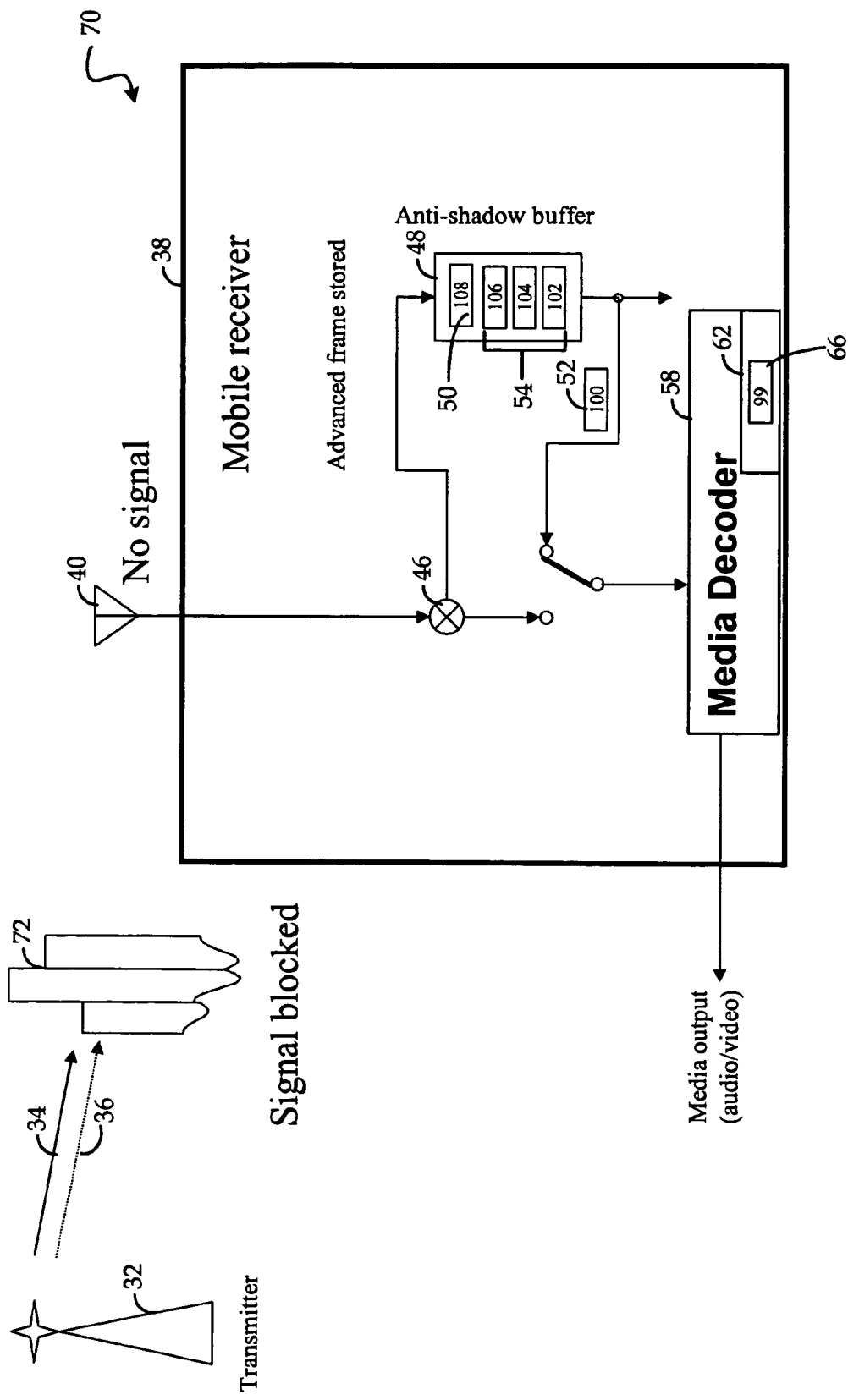
FIG. 3 comprises a block diagram of a mobile receiver during interrupted transmission according to various embodiments of the invention.

Turning now to FIG. 3, an overview of the receiver 38 during an interrupted transmission, in contrast, is shown and indicated generally at 70. A transmission interruption from the transmitter 32 results in signal blockages 72 to the receiver 38. In this case, the receiver 38 is no longer receiving any streams 34, 36 from the transmitter. The media stream, as a result, would be interrupted, and there would be skips during the play, which are generally apparent to the users. In this embodiment, however, users may not notice the signal blockage 72 at all because there is a backup copy of some of the data frames that are forward-shifted in the data frame sequence of the output media stream. Specifically, as shown, the data frame 60 (e.g., data frame sequence number 100) of the output media stream (shown in FIG. 2) has been interrupted or lost due to the signal blockage 72. In response, the controller 46 forwards the data frame 52 (e.g., data frame sequence number 100) stored in the anti-shadow buffer to compensate for the data loss of the data frame 60 as the data frame 66 (e.g., sequence number 99) is being outputted from the main media buffer 62 of the media decoder 58. Although both data frames 52 and 60 represent sequence number 100, they may or may not be of the same quality, depending on the specific implementation. As a result of the use of the data frame 52 from the anti-shadow buffer 48, the users may not even notice that data frame sequence number 100 was missing during the play of the media stream. This, in turn, increases the overall quality of the service. Moreover, depending on the size of the anti-shadow buffer and the predefined configuration of the anti-shadow stream, data loss resulted from long signal blockages can now be effectively compensated.

Figure 4:
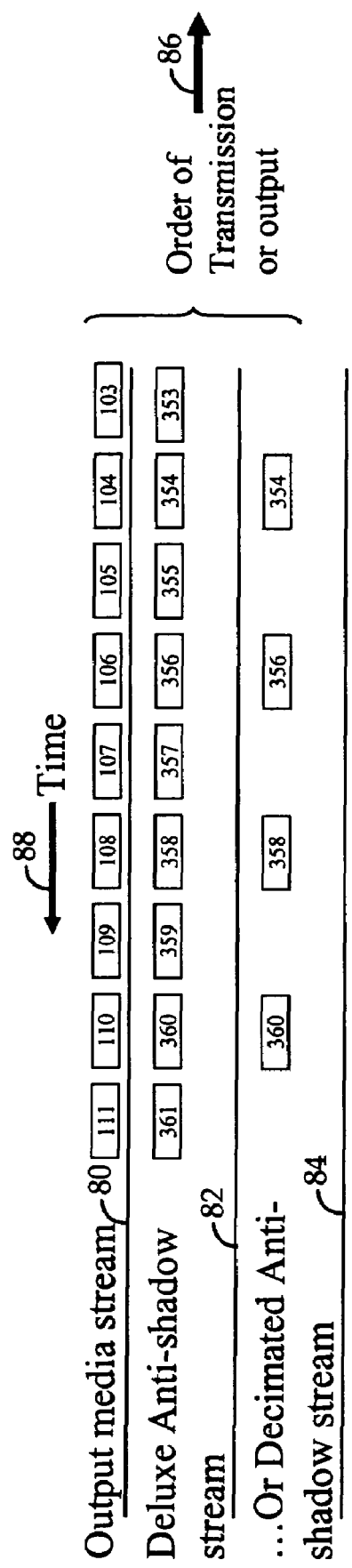
FIG. 4 comprises exemplary output media stream and anti-shadow streams according to various embodiments of the invention.

Referring now to FIG. 4, a data structure 80 of an output media stream along with various exemplary data structures 82, 84 of the anti-shadow stream based on the output media stream are shown. The output media stream 80 is shown with data frame sequence numbers 103-111. Going forward in data frame sequence of approximately 250 data frames ahead from the output media stream, a deluxe anti-shadow stream 82 with data frame sequence numbers 353-361 and a decimated anti-shadow stream 84 with data frame sequence numbers 354, 356, 358, and 360 are shown. The data frames of the streams 80, 82, 84 are shown in order of transmission or output 86 using components, such as the BCMCS.

The time offset between the output media stream and the anti-shadow stream is approximately 250 data frames. Thus, the output media stream is delayed 88 from the anti-shadow stream by approximately 250 data frames, which means that 250 data frames are recoverable at any given time. To put it differently, the anti-shadow stream is forward-shifted in the data frame sequence from that of the output media stream. Specifically, in this embodiment, there are at least 250 and 125 data frames stored in the anti-shadow buffer for the deluxe and decimated anti-shadow streams 82, 84, respectively. The deluxe anti-shadow stream 82 is substantially the same copy of the main media stream without any alternations. As a result, it is more deluxe, because there would particularly be no difference when the anti-shadow stream is used to replace the output media stream. This embodiment, however, takes large amounts of memory storage and more bandwidth overhead, which may be more expensive and undesirable for a mobile receiver but may be preferred for Internet helper applications operating on a general computer.

The decimated anti-shadow stream 84, on the other hand, is a reduced version of the main media stream. This embodiment provides efficiency for memory storage and bandwidth overhead but at the expense of the quality of anti-shadow stream. In order to reduce memory usage and bandwidth overhead, the anti-shadow stream can also be encoded with a lower resolution version or a compressed version of the main media stream while keeping the same number of frames. Of course, any combination of these features can also be implemented. There may be other data structures that have not been specifically shown, but they are within the scope of the various teachings since they are readily appreciated by a skilled artisan.

Figure 5:
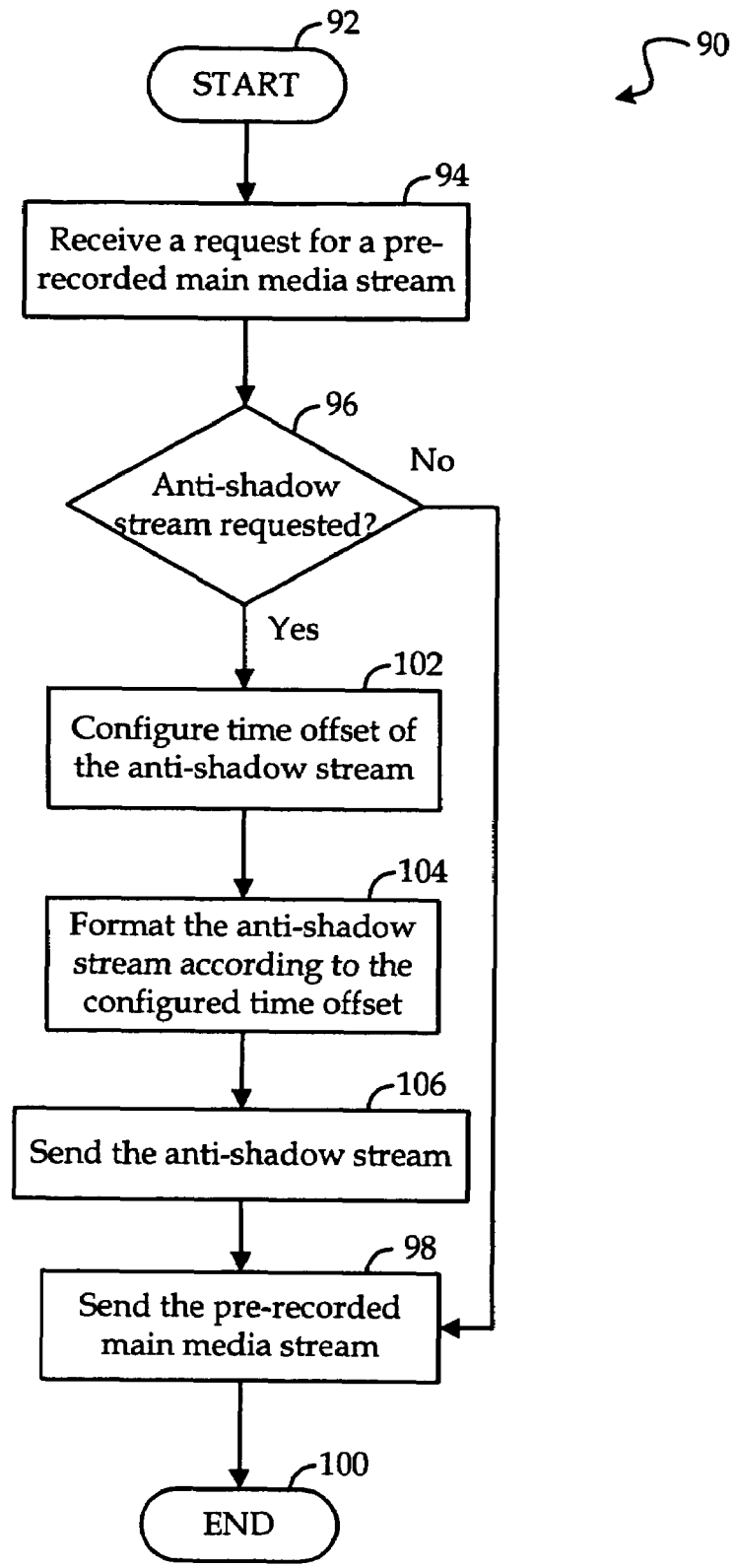
FIG. 5 comprises a flow chart diagram of a transmission process of a pre-recorded main media stream according to an embodiment of the invention.

Referring now to FIG. 5, a flow chart diagram of a transmission process of a pre-recorded media stream according to an embodiment of the invention is shown and indicated generally at 90. The transmission process is generally implemented with the provider end of the system. To correspond to the examples described earlier, this process would be implemented at the BCMCS. Other components in the system, however, can also be used. The process shows how a main media stream is formatted for transmission before it is sent to the requester according to one embodiment as an example. As such, these other various implementations are contemplated and included with the various teachings shown. Furthermore, the processes shown can be altered to be better suited for specific implementations, and thus variations of the process are also within the scope of the invention.

The transmission process, in this embodiment, is initiated 92 by a request for a pre-recorded media stream being received 94. In response to the request, it is determined 96 whether the anti-shadow stream has been requested. This step is to account for existing mobile stations that may not have been implemented with a new mechanism according to the various embodiments shown. An existing mobile station with legacy technology will likely not request an anti-shadow stream since it is not equipped to handle the two streams. If this is the case, the process sends 98 the pre-recorded main media stream, which brings the process to an end 100. If, however, the anti-shadow stream has been requested, a time offset is configured 102 for the anti-shadow stream. The anti-shadow stream is accordingly formatted 104 according to the configured time offset.

Several embodiments of the anti-shadow stream are contemplated with a pre-recorded main media stream. Since the output stream is delayed from the anti-shadow stream, one embodiment is to send the anti-shadow stream ahead of the output stream according to the configured time offset. In this case, the output stream would likely be the same as the pre-recorded main media stream, because there is no reason to format the output stream for the desired delay. This may not be workable, however, depending on the length of the start latency. When the approach of sending the anti-shadow stream ahead of the output stream is used, the receiver will receive data frames from the anti-shadow stream at the beginning (e.g., for the duration equal to the time offset). The receiver, in this case, will not start the play-out from the anti-shadow frames. Instead, the receiver buffers those arrived anti-shadow frames in its anti-shadow buffer and waits for the arrival of the first output media stream frame to start the play-out.

In another embodiment, the anti-shadow stream can be sent starting with a data frame configured to the time offset instead of starting with the first data frame. In this case, the output stream would start with the first data frame, and the anti-shadow stream that may be sent simultaneously would start with an "N" data frame of the main media stream. In this embodiment, the disadvantage is that any data lost in the first N data frames are not recoverable, but the advantage is that there would be no start latency and the output media stream does not have to be formatted to create the delay. In this embodiment, the output media stream is again preferably the same stream as the main media stream. Other embodiments using an output stream that is different from the pre-recorded main media stream are contemplated, and thus they are within the scope of the various embodiments. With these embodiments shown, the anti-shadow stream is sent 106, which is followed by the pre-recorded main media stream being sent 98. In other words, the anti-shadow stream and the main media stream will be sent simultaneously, but the anti-shadow stream content is time-shifted forward. This concludes 100 the process.

Figure 6:
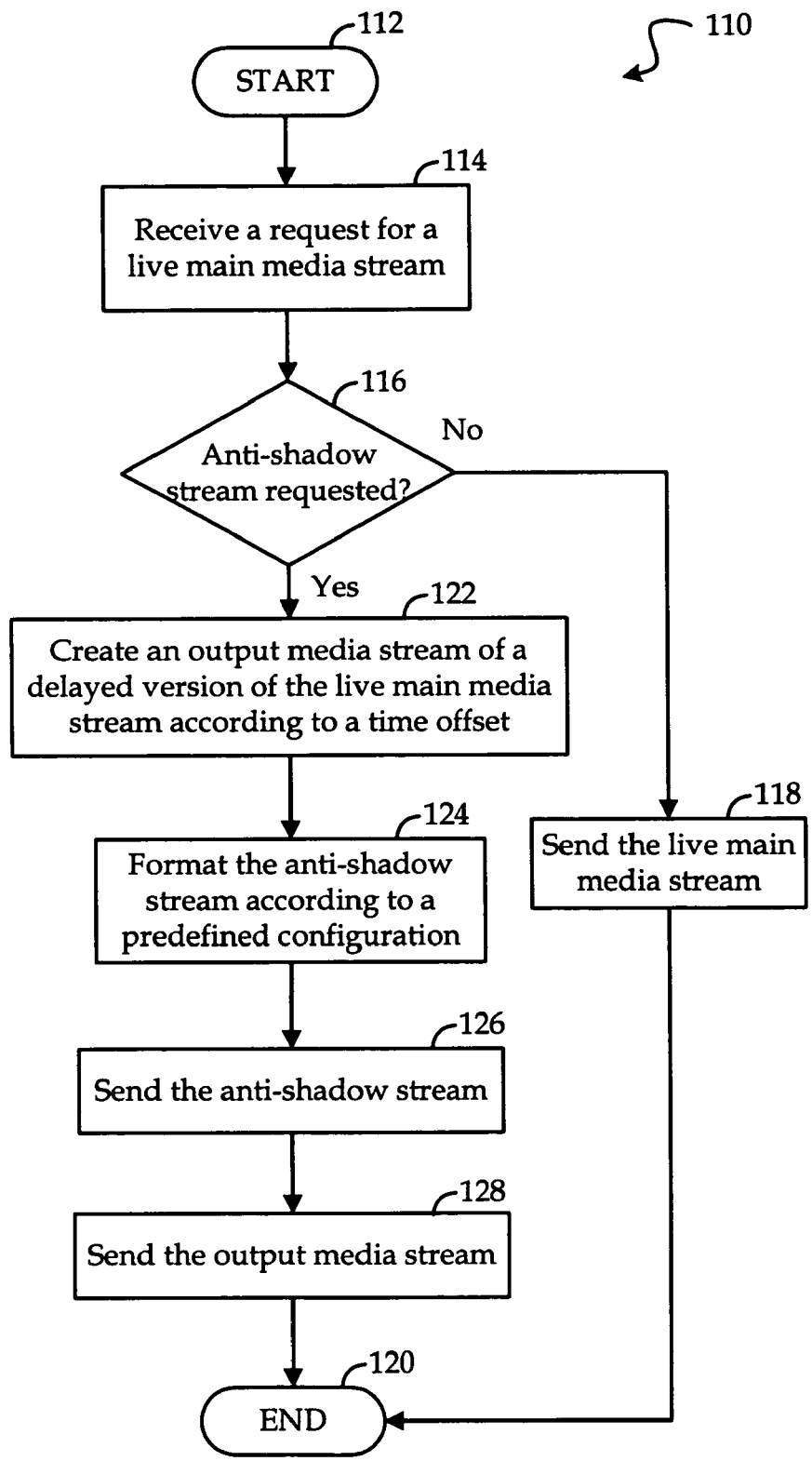
FIG. 6 comprises a flow chart diagram of a transmission process of a live main media stream according to an embodiment of the invention.

Turning now to FIG. 6, a flow chart diagram of a transmission process of a live media stream according to an embodiment of the invention is shown and indicated generally at 110. This process is similarly initiated 112 by receiving 114 a request for the live main media stream, and it is determined 116 whether an anti-shadow stream has been requested. If not, the process sends 118 the live media stream without the anti-shadow stream, and this process is concluded 120. If, however, an anti-shadow stream has been requested, a delayed version of the live main media stream is created 122 as the output media stream according to a time offset. The anti-shadow may also be formatted 124 according to predefined configurations discussed previously in FIG. 4. According to one embodiment, the anti-shadow stream is sent 126 via one logical channel, which is followed by the output media stream being sent 128 on another logical channel. The output media stream is formatted as a delayed version of the main media stream. The process ends 120 at this point.

Different embodiments of transmitting the anti-shadow stream and the output media stream are contemplated in the transmission processes shown in FIGS. 5 and 6. As typically done in stream processes, sequenced data frames of the media streams are generally sent in data packets. According to various embodiments, the anti-shadow stream and the output media stream, each containing their corresponding packets, can be sent substantially simultaneously using two separate logical communication channels or two different radio frequencies. Alternatively, the two streams can be sent substantially simultaneously using a single sequence of data frames. In one configuration of the single sequence of data frames, alternating data frames of the sequence can belong to the anti-shadow stream and the output media stream. This embodiment would require the receiver to separate the data frames of the two streams. As shown, there are a vast number of different embodiments for implementing the various teachings presented, and thus these various implementations, although it may not be specifically identified, are within the present scope.

Figure 7:
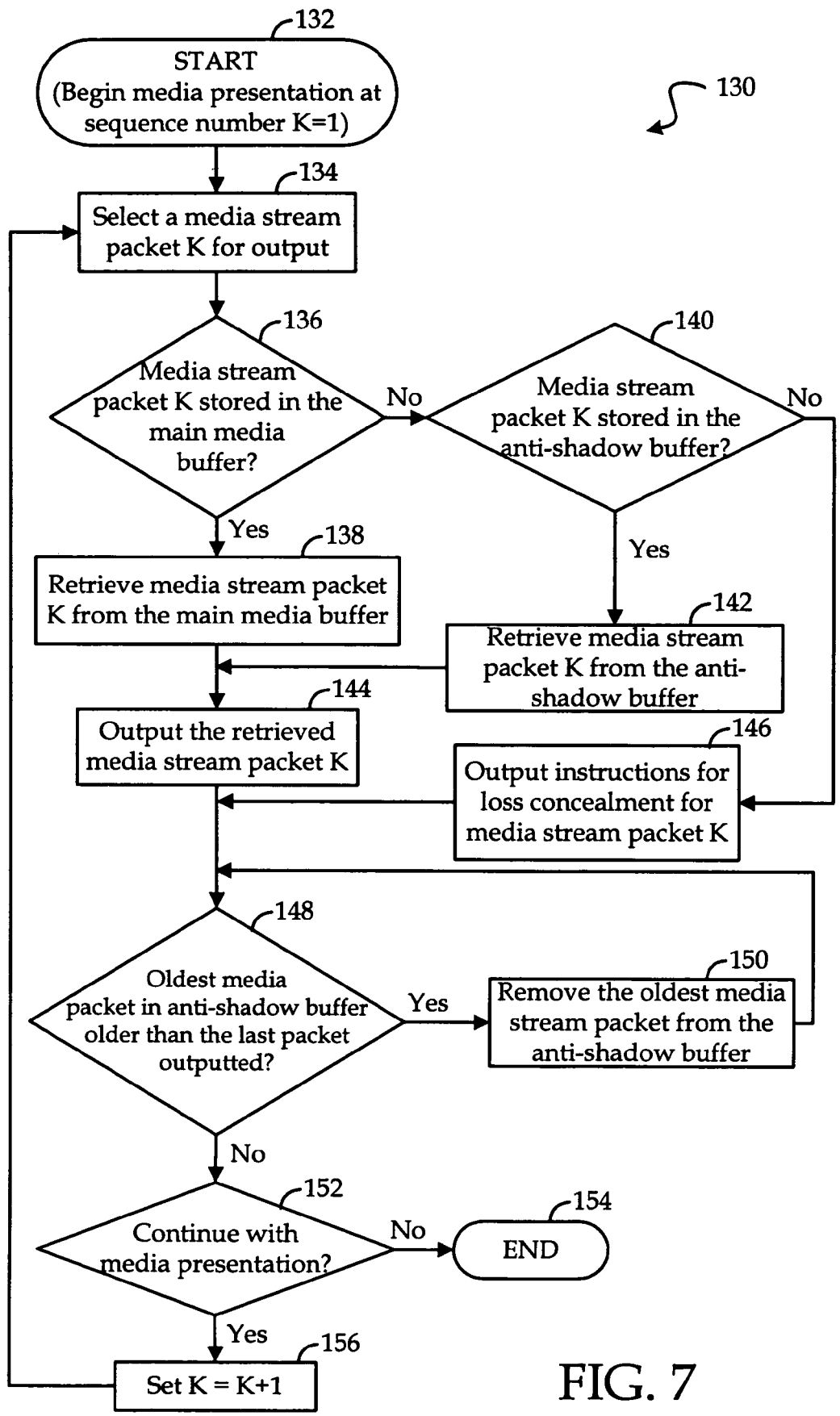
FIG. 7 comprises a flow chart diagram of an output process according to an embodiment of the invention.

Turning now to FIG. 7, a flow chart diagram of an output process according to an embodiment of the invention is shown and indicated generally at 130. Since the output process is generally implemented at the receiver end (e.g., requester), this process is implemented in the mobile station in one embodiment, specifically the mobile receiver. In another embodiment, the output process can be implemented within a software application for playing media stream, an application program interface of a program, or a browser plug-in. Other components can also be used, and the specific preferred implementation greatly depends upon the network and configuration of the system.

In this embodiment shown, the process starts 132 with a selection 134 of a media stream packet K that is to be outputted or played. In this example, since the main media stream generally contains packets of order sequenced data frames, the first media stream packet to be outputted would be first data sequence number (e.g., K=1). It should be noted, however, that a media stream packet includes one or more data frames, depending on the specific packet's implementation. Thus, any references to a media stream packet include embodiments of one or more data frames packaged in each media stream packet. After the media stream packet K is selected, it is determined 136 whether the media stream packet K is stored in a main media buffer. If so, the media stream packet K is accordingly retrieved 138 from the main media buffer. Otherwise, the media stream packet K may not have been received because of signal blockage, and in this case, it is determined 140 whether the media stream packet K can be found in the anti-shadow buffer. If so, the media stream packet K is retrieved 142 from the anti-shadow buffer to replace the media stream that is missing from the main media buffer.

Once the media stream packet K is retrieved, either from the main media buffer or the anti-shadow buffer, it is outputted 144, for example, to the media decoder in the receiver. If it turns out that the media stream packet K is not found in the anti-shadow buffer, instructions for the loss concealment for the media stream packet K may be outputted 142 to indicate that the media stream packet K has been lost and cannot be recovered. Once an appropriate output has been sent for the media stream packet K, it is determined whether an oldest media packet stored in the anti-shadow buffer is older than a last packet outputted. Using this step, any old media stream packet that is no longer needed (e.g., since it has already been outputted) is purged from the anti-shadow buffer. This way, the memory usage of the anti-shadow buffer can be conserved for relevant data frames.

Accordingly, if an oldest media packet stored in the anti-shadow buffer is older than the last packet outputted, it is removed 150 from the anti-shadow buffer and loops back to check again until this is no longer the case. Once there are no more oldest media packets in the anti-shadow buffer that is older than a last packet outputted, it is next checked to determine 152 whether the media presentation should continue. If not, the process ends 154. Otherwise, K is set 156 to K+1 to run the process for a next media stream packet, which restarts the process from the selection 134 of the new media stream packet K.

Figure 8:
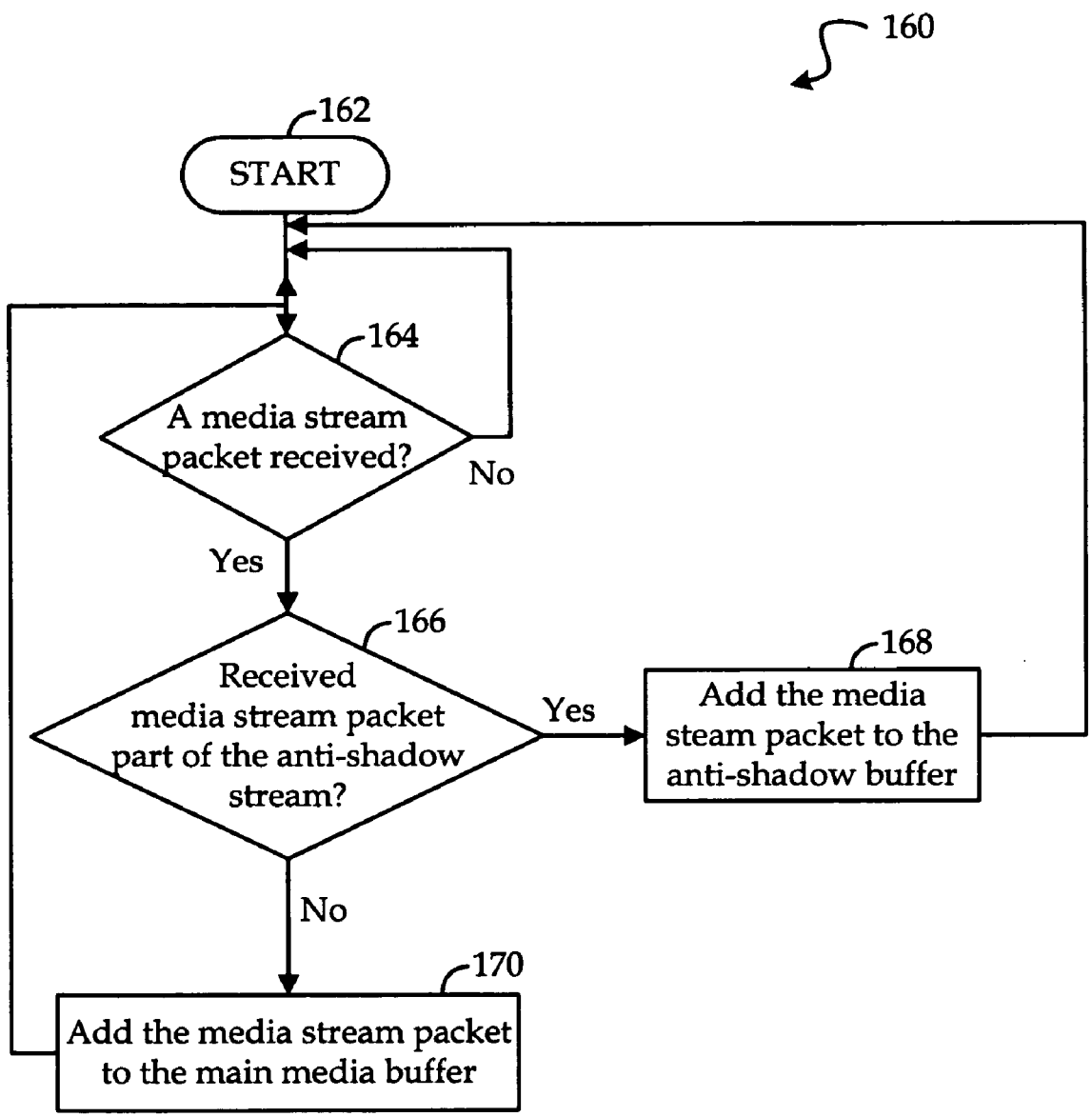
FIG. 8 comprises a flow chart diagram of a receiving process according to an embodiment of the invention.

Turning now to FIG. 8, a flow chart diagram of a receiving process according to an embodiment of the invention is shown and indicated generally at 160. This process, similar to the previous process shown in FIG. 7, is implemented at the receiver side (e.g., a requester) of the system. This process starts 162 by determining 164 whether a media stream packet has been received. If not, the process keeps checking until a media stream packet has been received. Once a media stream packet has been received by the process, it is next determined 166 whether the received media stream packet is part of the anti-shadow stream. If so, the received media stream packet is added 168 to the anti-shadow buffer that stores a backup copy of the main media stream. If the media stream packet is not part of the anti-shadow stream, the received media stream packet is added 170 to the main media buffer, which stores the output media stream.

With these various teachings shown, a technique of streaming media data has been provided. As a result of the various teachings shown, long signal blockages, such as ones greater than a minute, can now be effectively compensated since a separate backup copy of the main media stream is transmitted along with the output copy. The entire and/or large portions of the main media stream are fully recoverable, since the anti-shadow buffer can be refilled once the signal blockage is over. As a result, higher quality of service is provided, because the negative affects of the signal blockages have been minimized. Moreover, because the service quality during signal blockage can be specifically controlled by the service provider, new opportunities for layered pricing of the broadcast service are created. The various teachings of can easily be implemented with a legacy mobile station since they are not platform-specific, thus offering backward compatibility. The receiver is no longer required to wait at the start of the media stream for the filling of the buffer. Thus, the service start latency of the streaming process has been substantially eliminated as compared to other helper applications. These and other benefits, as a result, provide a streaming process of media data that is better suited for wireless networks while at the same time provide added flexibility in a wired network.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of sending a main media stream comprising:
    formatting an anti-shadow stream of the main media stream according to a predefined configuration, wherein the anti-shadow stream represents a backup copy of the main media stream;
    formatting an output media stream of the main media stream delayed from the anti-shadow stream by sending sequenced frames of the anti-shadow stream that are ahead of the sequenced frames of the output media stream according to a time offset such that the anti-shadow stream is forward-shifted from the main media stream, wherein the output media stream represents an output copy of the main media stream;
    sending the anti-shadow stream and the output media stream for output wherein the anti-shadow stream to be used as a media stream when the main media stream is not available after being sent.

2. The method according to claim 1, wherein the predefined configuration of the anti-shadow stream comprises any one or more configurations selected from a group of a lower resolution version of the main media stream, a reduced number of data frames version of the main media stream, a compressed version of the main media stream, and an unaltered version of the main media stream.

3. The method according to claim 1, wherein the main media stream comprises any one or more media streams selected from a group of a pre-recorded media stream and a live media stream.

4. A method of outputting a main media stream comprising:
    selecting a media stream packet of the main media stream for output;
    determining whether the selected media stream packet is stored in a main media buffer that stores an output copy of the main media stream;
    retrieving the selected media stream packet from the main media buffer when the selected media stream packet is stored in the main media buffer;
    determining whether the selected media stream packet is stored in an anti-shadow buffer that stores a backup copy of the main media stream when the selected media stream is not stored in the main media buffer;
    retrieving the selected media stream packet from the anti-shadow buffer when the selected media stream packet is stored in the anti-shadow buffer and is not stored in the main media buffer wherein the output copy is delayed from the backup copy of the main media stream by sequenced frames of the main media stream stored in the main media buffer being later than sequenced frames of the main media stored in the anti-shadow buffer according to a time offset such that the backup copy of the main media stream is forward-shifted from the output copy;
    outputting the retrieved media stream packet.

5. The method according to claim 4 further comprising:
outputting instructions for loss concealment for the selected media stream packet when the selected media stream packet is not stored in the anti-shadow buffer.

6. The method according to claim 4 further comprising:
determining whether an oldest media stream packet stored in the anti-shadow buffer is older than a last media stream packet outputted;
removing the oldest media stream packet from the anti-shadow buffer when an oldest media stream packet stored in the anti-shadow buffer is older than a last media stream packet outputted.

7. The method according to claim 4, wherein the backup copy of the main media stream is formatted according to a predefined configuration to minimize any one or more selected from a group of memory usage and bandwidth usage.

8. The method according to claim 7, wherein the predefined configuration comprises any one or more configurations selected from a group of a lower resolution version of the main media stream, a reduced number of data frames version of the main media stream, a compressed version of the main media stream, and an unaltered version of the main media stream.

9. A method for storing a main media stream comprising:
determining whether a received media stream is part of an anti-shadow stream of the main media stream, wherein the anti-shadow stream packet is a backup copy of the main media stream and wherein the main media stream is delayed from the backup copy of the main media stream according to a time offset such that the backup copy of the main media stream is forward-shifted from the main media stream;
adding the received media stream packet to a main media buffer that stores an output media stream that is an output copy of the main media stream, when the received media stream packet is not part of the anti-shadow stream;
adding the received media stream packet to an anti-shadow buffer that stores the anti-shadow stream of the main media stream when the received media stream packet is part of the anti-shadow stream, and
retrieving a retrieved media stream packet from the from the anti-shadow buffer when it is determined that the retrieved media stream packet is not in the main media buffer,
wherein the output copy of the main media stream is delayed by sequenced frames of the main media stream stored in the main media buffer being later than sequenced frames of the main media stream stored in the anti-shadow buffer according to the time offset.

10. The method according to claim 9, wherein the anti-shadow stream is formatted according to a predefined configuration to minimize any one or more selected from a group of memory usage and bandwidth usage.

* * * * *